2,902,368
METHOD OF PRODUCING A TEA EXTRACT

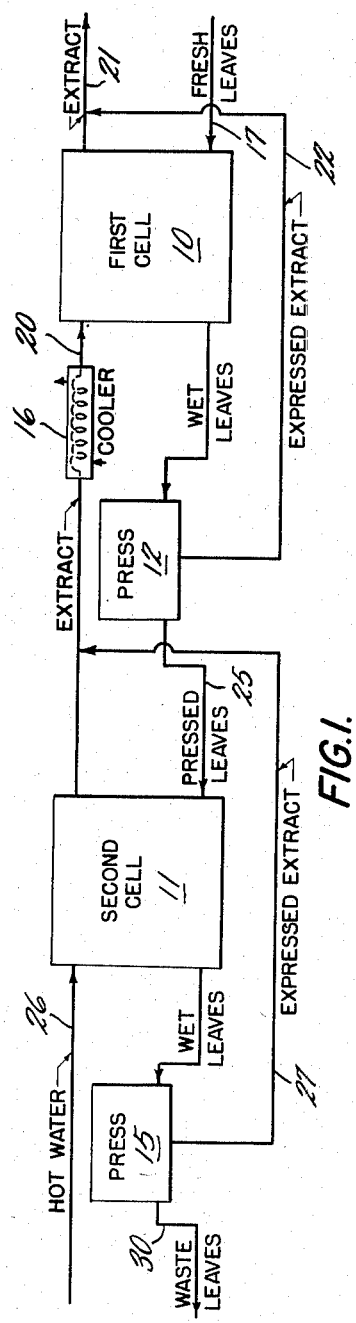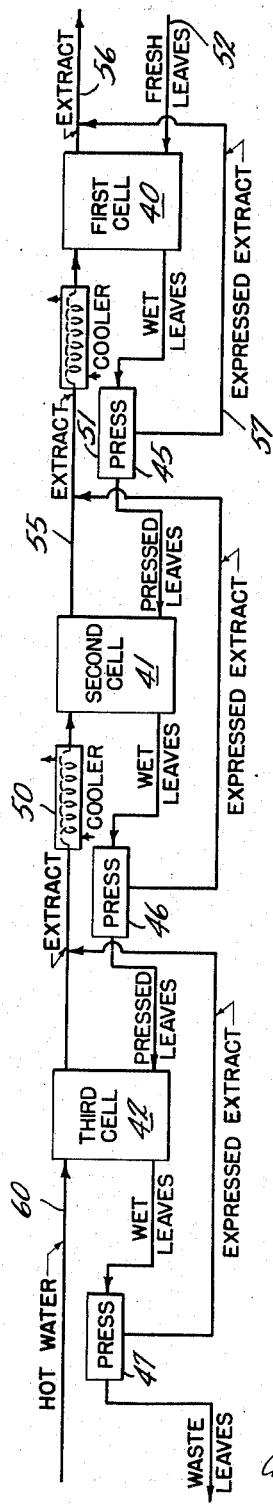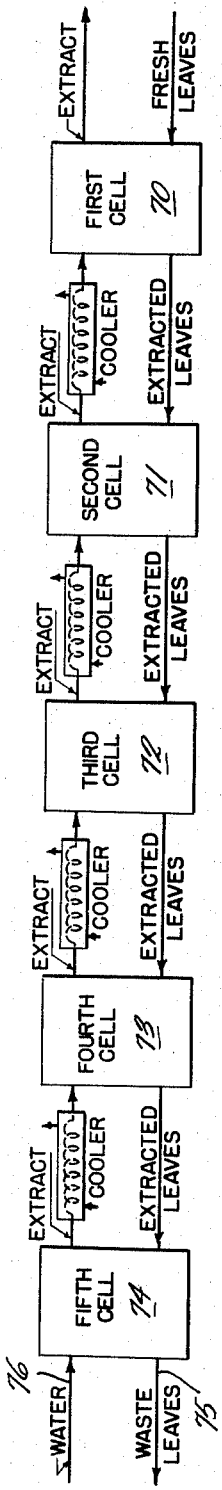

Edward Seltzer, Teaneck, N.J., and Frederick A. Saporito, Franklin Square, N.Y., assignors to Thomas J. Lipton, Inc., Hoboken, N.J., a corporation of Delaware Application April 9, 1956, Serial No. 577,164

4 Claims. (Cl. 99—77)

This invention relates to a method for extracting tea leaves and to a method that may be used in the preparation of tea products such as concentrates and powders.

In preparing tea products of the type named, tea leaves are extracted, usually with a hot solvent, and a portion or all of the solvent is then removed by evaporation. In such a process it is desirable to extract from the leaves substantially all of the soluble ingredients which impart to the tea beverage its desirable characteristics, including the aromatics, the tannins (which produce astringency and color), and the caffeine (which produces bitterness and physiological effect).

The present invention provides a method for recovering from the tea leaves substantially all of the essential ingredients of the leaves without excessive dilution of the extract, that is, with a high concentration of soluble tea solids in the extract. The high concentration of soluble tea solids in the extract results in an economy in the consumption of heat and equipment size required for all extraction operations as well as for evaporation of the solvent and reduces the loss of volatile aromatic ingredients and the degradation in color and flavor during the subsequent removal of water from the extract. As a result, a powdered or concentrated tea product can be produced which, when reconstituted with water, will possess authentic aroma, flavor and color as compared with a freshly brewed cup of tea.

Another advantage of the invention is that it provides a method for recovering substantially all of the desired ingredients of the tea leaves (both volatile aroma and soluble solids responsible for favorable color and flavor) without excessive dilution of the extract. Other advantages of the invention will appear from the following description.

The process of the invention is carried out by subjecting the tea leaves to a series of equilibrium bathwise extractions with countercurrent flow of the tea leaves and the water, using in any given extraction cell the extract from a subsequent cell (or fresh water, in the case of the last cell) and the tea leaves from a previous series cell (or fresh leaves, in the case of the first cell), controlling the temperature in the first cell to a level not above 175° F. so as to recover and retain in the extract the volatile aroma from the fresh leaves, controlling the temperature in the last cell to a level not below 200° F. to recover all of the desired less soluble ingredients from the partially-extracted leaves, and controlling the ratio by weight of water in the system to dry leaves within the range of about 9:1 to about 13:1 so as to recover a high percentage, i.e., at least about 80%, of the soluble tea solids in the leaves while producing a final extract having a concentration of soluble tea solids of at least about 2.5%. The extract may thereafter be treated to remove water and recover a tea product which, when reconstituted to beverage strength, will have the aroma and substantially all of the flavor and the color of a freshly brewed cup of tea.

The term "fresh" water is used herein to distinguish extracts of the tea leaves from solvent which is first added to one of the extraction cells, and hence includes condensates and other liquids which may be recycled from the recovery operations. The amount of soluble tea solids in the leaves is determined by the standard method described in "Methods of Analysis of the Association of Official Agricultural Chemists," eighth edition (1955), page 240, paragraph 14:25.

The invention will be further described in connection with the appended drawings.

Figure 1 is a flow diagram describing one method of carrying out the invention.

Figure 2 is a flow diagram illustrating another method of carrying out the invention, in which a larger number of cells is used.

Figure 3 is a flow diagram illustrating another method of carrying out the invention, in which a still larger number of extraction cells may be used.

Referring to Figure 1, the references number 10 and 11 represent the first and second extractor cells, respectively, in a batch countercurrent extraction system. The extractors typically are jacketed covered kettles having a centrally mounted rotating agitator provided with blades which extend adjacent the interior walls of the kettle. A jacketed, scraper-agitated kettle having a secondary agitator located off center and rotating in the space between the axis of the kettle and the main scraper-agitators is satisfactory. However, other types of extraction apparatus may be utilized. Other parts of the extraction system include the presses 12 and 15 and the cooler shown schematically at 16. Such a cooler may be of the plate type or of the sanitary type of double-pipe heat exchanger. The fresh leaves are introduced to the first cell at 17, together with the extract from the second cell from the pipe 20. The temperature of the extract removed from the second cell is higher than the temperature maintained in the first cell and accordingly, the cooler 16 is used to reduce the temperature of the extract to the desired level which, as previously indicated, is below 175° F.

The fresh leaves and the extract are stirred in the first cell for a time sufficient to produce substantial equilibrium between the dissolved and undissolved components of the leaves. The extract is then drained from the leaves and removed from the vessel through the pipe 21. The leaves which still contain occluded and absorbed extract are removed from the vessel 10 (the first cell) and squeezed in the press 12 to remove such absorbed and occluded extract, which then passes through the pipe 22 and is combined with the extract leaving the first cell through the pipe 21. Pressing typically should reduce the moisture content of the extracted leaves to 60–70% wet basis. Better pressing will produce more efficient operation resulting in a higher recovery of soluble tea solids.

The pressed leaves are added to the vessel 11 (the second cell) at 25, which is also charged with the desired quantity of hot, fresh water through the pipe 26. The temperature of the material inside of the extractor 11 is maintained above 200° F. in order to assure the extraction of all of the desired material from the leaves before they are discarded. The hot water and once-extracted leaves are stirred in the extractor 11 for a time sufficient to produce substantial equilibrium between the soluble tea solids in the extract and soluble tea solids in the leaves at the temperature prevailing in the extractor. After equilibrium has been reached, the extract is drained from the leaves and passes through the pipe 20 on its way toward the extractor 10 (the first cell) as previously described. The leaves are withdrawn from the vessel 11 and introduced to the press 15, where the occluded and absorbed extract is removed. The recovered extract then passes through the pipe 27 and is combined with the extract passing through pipe 20 on its way to the first extraction cell. The pressed leaves are removed from the press 15 at 30 and are discarded. The product extract at this point has taken from the leaves in the first cell, and the succeeding cells, substantially all of the aromatic ingredients as well as those which impart the desirable color and flavor to the tea and contains these in a concentration of at least 2.5%. It is ready for the succeeding processing for the removal of water and the production of a tea product which may be diluted to produce a tea beverage which will be comparable to a freshly brewed cup of tea.

By pressing the extracted leaves between successive extraction cells, the efficiency of the operation is greatly increased and accordingly, the number of cells required for the efficient recovery of soluble tea solids from the leaves is greatly decreased. Hence, it is preferred to carry out such pressing operations between extractions. Another method of carrying out the invention, also with the pressing of leaves between extraction cells, is illustrated in Figure 2, which describes an operation in which three, rather than two, extraction cells are utilized. The reference numbers 40, 41 and 42 designate the respective extractors, while the presses are indicated at 45, 46 and 47. The coolers which are used to control the temperature of the extractant in the successive extraction steps are indicated at 50 and 51. The fresh leaves from the source 52 and the cooled and twice-used solvent from the pipe 55 are stirred together in the vessel 40 (the first cell) at a temperature not above 175° F for a time sufficient to produce equilibrium. Afterwards, the extract is drained from the leaves and removed through the pipe 56, and the wet leaves are compressed in the press 45 to reduce the moisture content to about 60 to 70% wet basis. The recovered extract flows through the pipe 57 and is combined with the product extract flowing through the pipe 56. The extract contains the desirable ingredients of the tea leaves in a concentration of at least 2.5% soluble tea solids. The pipe 56 leads to apparatus for removing the solvent and recovering a tea product.

The operation of the succeeding second and third cells is similar to the function of the first cell in that the extract from the succeeding extraction cell (or fresh, hot water in the case of the third cell) is used to treat the leaves from the previous extraction cell (or fresh leaves, in the case of the first cell) to extract the remaining soluble tea solids therein under conditions of substantial equilibrium at the prevailing temperature. The extract then passes to the previous extraction cell while the pressed leaves pass to the succeeding extraction cell for further treatment (except that the pressed leaves from the third extraction cell are discarded). The temperature of the water, which is added to the third cell (vessel 42) through the pipe 60 is maintained sufficiently high to remove from the leaves all of the desired soluble ingredients thereof before they are finally discarded. The temperature maintained in the third cell for this purpose is at least 200° F.

Figure 3 is a flow diagram of a process in which the tea leaves are not compressed between extractions but instead, a greater number of extraction steps are carried out in order to recover efficiently the soluble tea solids from the leaves. To the first extraction cell 70 there are added fresh leaves and the cooled extract (not above 175° F.) from the second cell 71. The extraction is carried out at a temperature not above 175° F. After equilibrium has been reached in each cell, the extract is drained and used again as solvent and the leaves are further extracted. Such draining may consist of transfer through a perforated reel, or over a shaker screen, or through a pulper or an auger-type juice extractor. The extract drained from the leaves in the first cell (70) is removed as product. This extract has the desired qualities of the extracts prepared according to the procedures described in Figures 1 and 2, that is, substantially all of the soluble tea solids, plus aroma, in a concentration greater than 2.5%. The once-extracted leaves and the cooled extract from the third cell 72 are stirred together in the second cell 71 until equilibrium is reached, after which the leaves and extract are separated as described for the first cell. In each of cells 2, 3 and 4 the cooled extract returned from the next succeeding cell is mixed with tea leaves withdrawn from the next preceding cell. Water, instead of extract, is added to the fifth cell as extractant and the extracted tea leaves are removed at 75 and discarded. The temperature of the water added to the fifth cell at 76 is above 200° F., so that all of the desired ingredients will be removed from the leaves before they are discarded. The temperatures of the intervening extraction operations carried out in cells 2, 3 and 4 are preferably intermediate between the maximum temperature (at least 200° F.) in the fifth cell and the lower temperature (not greater than 175° F.) in the first cell. Each cell may have a temperature slightly higher than the temperature of the cell immediately preceding it.

The concentrated extract which is removed as the product of the extraction procedure of the invention may be concentrated by processes designed to preserve the aroma, flavor and color of the tea beverage to which the tea product is diluted when consumed, or may be used as such as a tea product and diluted to beverage strength. One process which may be used with advantage to remove the solvent is described in the co-pending application of Seltzer and Saporito, Serial No. 565,004, filed February 13, 1956. In the latter process, a portion, i.e., 5 to 30%, of the extract is evaporated under vacuum and condensed as a dilute aroma which is then fractionated at substantially atmospheric pressure to produce a concentrated aroma. The remaining unevaporated 70 to 95% of the extract, which is designated dearomatized extract, is concentrated under vacuum to produce a concentrated extract having a concentration of tea solids of 25 to 45%, for example. The concentrated aroma and the concentrated extract are mixed. The mixed concentrates may be used as such as a tea product and diluted to beverage strength to obtain an acceptable beverage. The higher solids concentrate may, after addition of the aroma concentrate, be spray-dried without the addition of corn syrup solids. Optionally, when the tea solids concentration of the extract is about 25% an amount of non-sweet corn syrup solids or similar material which will improve the retention of the aroma in the product during the subsequent drying operation, is added with the concentrated aroma to the extract, the amount of such added solids being equal to the total amount of tea solids in solution. The mixture then is dried, preferably spray-dried, to produce a free-flowing tea powder.

The following are several examples of how the extraction process of the invention may be carried out.

*Example 1*

A blend of one-third of each of Ceylon black tea, South India black tea and Indonesia black tea is extracted in a two-stage countercurrent extraction process of the type described in Figure 1. The extraction vessels are scraper-agitated steam-jacketed 15-gallon stainless steel kettles. In the first cell 12 pounds of fresh leaves are agitated with the dilute extract from the second cell containing 1 to 2% tea solids. The ratio of extract added to the first cell to the leaves added to the first cell (dry basis) is 10:1. The agitation is continued for 15 minutes at an average temperature of 170° F. Over 50% of the extractable soluble tea solids are thereby removed from the leaves at a temperature substantially below the boiling point. This not only minimizes the loss of aroma but also helps to prevent the development of a cooked flavor and darkening of the color. The leaves removed from the first cell are pressed in a hand-operated wine-type screw press or a hydraulic press. The tea extract product which is removed contains 3.5 to 4.5% soluble tea solids and contains about 85% of the A.O.A.C. soluble solids in the leaves. The pressed leaves are then extracted with boiling water in the second cell, with a ratio of 10 parts by weight of water to 1 part of original unextracted leaves, dry basis. The extraction is carried out for 10 minutes, after which the leaves are again pressed and the liquid is combined with the extract on its way to the first cell. The extract is strained to remove insoluble solids such as bits of leaf and sediment or tea fines and is fed, preferably while hot, to a single-pass stripping still or evaporator operated under a vacuum of at least 25 inches of mercury at a temperature of 135° F. in the vapor separator section. The vapor produced, which is about 18.5 parts per 100 pounds of dilute extract and is designated dilute aroma, is condensed and collected in a receiver. The unvaporized liquid, amounting to about 81.5 parts and designated dearomatized extract, is withdrawn from the vapor separator section of the evaporator through a pump. It contains about 4.8% soluble tea solids and is fed to an upflow vacuum evaporator operated under a vacuum of about 27 inches of mercury at 122° F. in the vapor separation section. The liquid undergoing concentration in the evaporator recirculates through it and through its heater by natural or forced circulation. The amount of concentrated extract recovered is about 13 parts per 100 parts of dilute extract and contains about 25% solids. The vapors withdrawn toward the vacuum source may be condensed and recovered by suitable procedures if desired.

The dilute aroma is pre-heated or vaporized and introduced at an intermediate point of an aroma fractionating column operated at substantially atmospheric pressure. The overhead vapors are condensed and 95% of the condensate is added back continuously at reflux at the top of the column. Heat is applied in an amount sufficient to strip aroma from the liquid flowing down the column. The concentrated aroma, in the amount of 1.25 parts per 100 parts of dilute extract, is recovered and combined with the concentrated extract. To the combined concentrated aroma and extract there is added an amount of corn syrup solids equal to the tea solids in the extract, thereby to produce a solution of about 39% solids content after the addition of the aroma concentrate. The latter is pre-heated to 140° F. and fed to the spray dryer. The inlet temperature of the dryer air is 428 to 439° F. and the outlet temperature is 219 to 230° F. A free-flowing powdered tea product is recovered. The tea powder or the mixture of concentrated extract and concentrated aroma when reconstituted to beverage tea strength with water, has aroma and flavor which are comparable to those of freshly brewed tea.

*Example 2*

Sumatra black tea is extracted with hot water according to the procedure described in Figure 1, with the ratio of water to tea leaves (dry basis) of 10 to 1, the temperature in the first extraction cell being 170° F. and the temperature in the second extraction cell being 212° F. to produce an extract having a soluble tea solids content of 4.1%, representing 80% of the soluble components of the leaves. Fine, insoluble material is removed from the extract by passing it through a centrifuge at a temperature of about 140° F. It is then passed through a vacuum flash evaporator operated at a vacuum of 25 inches of mercury, and about 20% of the extract feed is removed as a dilute aroma vapor. The remaining 80% of the extract, which contains 5.2% soluble tea solids, is cooled to a temperature of 79° F. and maintained at such temperature for one hour while slowly stirring the liquid. A cloud or "cream" of the less soluble constituents of the tea solids forms upon such cooling. The creamed extract is then passed through a Westfalia KDD604 four-chamber centrifuge at the rate of about 19 gallons per hour in order to remove the creamed solids. The average temperature of the liquid passing through the centrifuge is 79° F. The effluent of the centrifuge is clear. The decreamed dilute extract is concentrated in a vacuum concentrator operated at 27 inches of mercury vacuum, to produce a concentrated extract having about 25% soluble tea solids. The dilute aroma vapor is withdrawn from the vacuum flash evaporator condensed and introduced to an aroma concentrating column operated under substantially atmospheric pressure as described in the application Serial No. 565,004 referred to above. The concentrated aroma is added to the concentrated decreamed extract to produce a liquid having 23% soluble tea solids. To the solution there is added corn syrup solids in an amount equal on a dry basis to the weight of tea solids, which brings the total solids concentration up to 37%. The liquid is then fed to a spray dryer, after being pre-heated to a temperature of 130° F. The spray dryer is operated at a 440° F. inlet air temperature and a 225° F. outlet air temperature. When a sample of the tea powder is added to cold (50° F.) water in an amount to produce a tea beverage having 0.4% tea solids and is stirred a beverage having good clarity is produced in a few seconds. The percentage of solids removed as "cream" based on the total amount of dissolved solids in the extract prior to creaming is 11.8%.

*Example 3*

A quantity of Ceylon black tea leaves is extracted in a three-stage countercurrent batch extraction procedure, with intermediate pressing of the leaves, as described in Figure 2. In the first cell, the fresh leaves are extracted for 15 minutes at 165° F. In the second cell the once-extracted leaves are mixed for 10 minutes with the extractant at 212° F. In the third cell the twice-extracted leaves are mixed with fresh water for 10 minutes at 212° F. The ratio of water to bone dry leaves is 10:1. The concentration of soluble tea solids in the extract leaving the first cell is 4.5 to 4.7%; the concentration of solids in the extract leaving the second cell is 1.8 to 2.2%; and the concentration of tea solids leaving the third cell is 0.7 to 0.9%. The overall percentage recovery of the total soluble tea solids in the extract from the first cell is 82 to 92%. The extract when reconstituted to beverage strength, has substantially the aroma, color and flavor of a freshly brewed beverage prepared directly from tea leaves. The extract can be concentrated and dried, for example by the method described in Example 2 to produce a tea powder, which when diluted to beverage strength, has authentic tea flavor, color and aroma.

*Example 4*

An extraction operation is carried out in the laboratory using apparatus and procedure described in Figure 3, i.e., a 5-stage countercurrent batchwise extraction without pressing between the cells. The extract is removed from the leaves by draining through coarse cloth. To start out the operation, tea extracts are prepared having approximately equilibrium concentrations as determined by previous experience. The extraction operation is then carried out through seven cycles, adding 50 grams of fresh tea leaves to the first cell in each cycle and transferring the extracted tea leaves toward the cell having the next higher number, and the drained extract solution in the opposite direction. The concentrations of soluble tea solids in each cell and other pertinent data after the seventh cycle are presented in the following table.

| Cell No. | Extract, Percent Solids | Extract Wt., Gm. | Percent Moisture in Leaves | Wt. Leaves, gm. |
|---|---|---|---|---|
| 1 | 4.53 | 391 | 81.0 | 247 |
| 2 | 2.10 | 589 | 83.8 | 242 |
| 3 | 1.10 | 578 | 85.3 | 246 |
| 4 | .53 | 570 | 85.9 | 251 |
| 5 | .20 | 576 | 87.1 | 252 |

An average of about 91.5% of the soluble tea solids in the fresh leaves is recovered in the extract. The extract, as a tea product, can be diluted to produce a beverage having, at beverage strength, an acceptable aroma, flavor and color, or it can be concentrated as illustrated in the foregoing examples to prepare a concentrate or powder having an acceptable aroma, flavor and color when diluted to beverage strength.

The process of the invention provides a multi-stage countercurrent batchwise extracting procedure with agitation in each stage, starting with a relatively low temperature and proceeding to successively higher temperatures in each extraction stage. The first stage is above about 80° F. but less than 175° F. and preferably in the range 140 to 165° F. The last stage is above 200° F., but not high enough to dissolve an undue amount of normally insoluble material, i.e., below about 250° F., preferably in the range 200 to 212° F.

In the first stage of a three-step extraction process using standard efficient commercial double-motion agitators, the temperature may be 140 to 165° F. and the time of extraction about 10 minutes, while in the second stage the temperature may be 160 to 180° F. and the time of extraction 10 minutes. In the third stage the temperature is preferably about boiling and the time of extraction on the order of 7 to 8 minutes.

While in the process of this invention the total amount of water used relative to the amount of leaves treated is maintained as low as feasible, as a practical matter it will be found that there is a certain minimum amount of water that is needed in order to carry out the method, determined largely by the water that is absorbed by the leaves and cannot be readily pressed out of them by applying physical pressure thereto. Accordingly, it is preferred that the ratio of water to leaves be not less than 9:1. By restricting the amount of water employed relative to the quantity of leaves to a ratio below about 13:1 and using the countercurrent batchwise procedure described, the concentration of tea solids in the extract may be maintained above 2.5%, while recovering at least 80% of the soluble tea solids in the leaves and permitting the preservation of the aroma, flavor and color of the tea.

The minimum number of extraction cells in the process of this invention is two, and this number generally only will be permissible if the leaves are pressed following each extraction, thereby to improve the efficiency of the process and recover as much as possible of the dissolved tea solids from the waste leaves. A larger number of cells may be used and if the leaves are not pressed after each extraction step, generally it will be necessary to use a larger number of extraction steps in order to recover the required minimum of about 80% of the soluble tea solids in the leaves to make the process economically feasible. The leaves may be comminuted before extraction thereby to increase the yield obtainable under a given set of operating conditions, although excessive comminuting may cause undesirable flavors in the tea beverage produced from the extract.

As heretofore stated the invention provides a method for producing a tea extract having a high concentration of soluble tea solids, consistently with a good recovery of the tea solids from the leaves. The recovery may be as high as 100% by using enough cells. However, in the interest of producing a tea product which will produce a beverage having authentic flavor and color it is preferred to control the extraction process to avoid degrading the soluble tea solids. Since, generally speaking, degradation is caused by high temperature and prolonged time of contact between the tea leaves and the hot extract, the use of a limited number of extraction cells and the avoidance of excessively high temperatures may be found to be advantageous even though the resulting yield of soluble tea solids is substantially below 100%. The time of processing of the leaves at elevated temperature is reduced to a minimum during extraction and pressing, so as to minimize the oxidative deterioration of color and flavor which would be produced by the contact with air at such temperatures.

In this specification there has been described what is believed to be the best mode of practicing the invention, but the invention is not confined to the embodiment shown. It is intended to cover by Letters Patent the invention as set forth in the appended claims.

We claim:

1. The method of producing an extract of tea leaves which comprises extracting the leaves in an equilibrium batchwise countercurrent process having two to three stages in which the fresh leaves are introduced at the initial stage and fresh water at the final stage, contacting partially spent tea leaves with said fresh water in the final stage to produce an aqueous extract, passing the extract in contact with fresh leaves in the initial stage to obtain a completed extract, maintaining the temperature of the final stage at about 200 to 250° F., maintaining the temperature of the initial stage about 80 to 175° F., maintaining the ratio of the total amount of fresh water introduced at the final stage and the dry weight of tea leaves introduced at the initial stage within the range from about 9:1 to about 13:1, pressing the leaves after each stage to expel absorbed and occluded extract therefrom before extracting the leaves in the next subsequent stage and recovering said expelled extract, and withdrawing from the initial stage a completed extract having at least 2.5% soluble tea solids and containing at least about 80% of the soluble tea solids in the leaves.

2. The method of producing an extract of tea leaves with comprises extracting the leaves in a multi-stage equilibrium batchwise countercurrent process in which the fresh tea leaves are introduced at the initial stage and extracted at a temperature below about 175° F. and fresh water is introduced at the final stage at a temperature above about 200° F., contacting partially spent tea leaves with said fresh water in the final stage to produce an aqueous extract, separating the leaves from the extract so produced, pressing the leaves after separation to remove occluded and absorbed extract, passing the extract into contact with fresh tea leaves in the initial stage to obtain a complete extract, separating the completed extract from the tea leaves, pressing the leaves from the initial stage to remove occluded and absorbed extract therefrom and recovering the extract obtained by the pressing of the leaves.

3. The method of claim 1 wherein the extract obtained by pressing the leaves from the final stage is combined with the extract leaving the final stage and the extract obtained by pressing the leaves from the initial stage is combined with the extract leaving the initial stage.

4. The method of claim 1 in which the temperature in the first extraction cell is in the approximate range 140 to 165° F. and the temperature in the last extraction cell is in the approximate range 200 to 212° F.

References Cited in the file of this patent

UNITED STATES PATENTS

| | | |
|---|---|---|
| 2,234,063 | Rolle | Mar. 4, 1941 |
| 2,340,758 | Kappenberg | Feb. 1, 1944 |
| 2,515,730 | Ornfelt | July 18, 1950 |
| 2,785,979 | Mitchell | Mar. 19, 1957 |

FOREIGN PATENTS

| | | |
|---|---|---|
| 3,192 | Great Britain | of 1896 |
| 559,758 | Great Britain | Mar. 3, 1944 |